(12) United States Patent
Mello et al.

(10) Patent No.: US 8,439,759 B1
(45) Date of Patent: May 14, 2013

(54) SYSTEM AND METHOD OF FACILITATING EXTERNAL NOTIFICATIONS FOR EVENTS THAT OCCUR IN A PLURALITY OF DIFFERENT VIRTUAL SPACES

(75) Inventors: Stephanie Mello, San Francisco, CA (US); Deepak Polamarasetty, Fremont, CA (US); Wendy Yu, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

(21) Appl. No.: 13/558,878

(22) Filed: Jul. 26, 2012

(51) Int. Cl.
*A63F 9/24* (2006.01)

(52) U.S. Cl.
USPC .............................................. 463/42; 715/757

(58) Field of Classification Search .............. 463/25–42; 715/757
See application file for complete search history.

(56) References Cited

U.S. PATENT DOCUMENTS

| | | | |
|---|---|---|---|
| 8,137,193 B1 | 3/2012 | Kelly et al. | 463/31 |
| 2005/0009600 A1* | 1/2005 | Rowe et al. | 463/29 |
| 2007/0265091 A1 | 11/2007 | Aguilar, Jr. et al. | 463/42 |
| 2008/0090659 A1 | 4/2008 | Aguilar et al. | 463/42 |
| 2008/0188308 A1* | 8/2008 | Shepherd et al. | 463/39 |
| 2008/0207327 A1 | 8/2008 | Van Luchene et al. | 463/42 |
| 2009/0088259 A1* | 4/2009 | Gosztyla et al. | 463/43 |
| 2009/0104954 A1* | 4/2009 | Weber et al. | 463/1 |
| 2009/0131151 A1* | 5/2009 | Harris et al. | 463/22 |
| 2010/0005480 A1 | 1/2010 | Mallempati et al. | 719/318 |
| 2010/0229106 A1 | 9/2010 | Lee et al. | 715/757 |
| 2012/0110477 A1 | 5/2012 | Gaume | 715/757 |

\* cited by examiner

*Primary Examiner* — Masud Ahmed

(74) *Attorney, Agent, or Firm* — Pillsbury Winthrop Shaw Pittman LLP

(57) ABSTRACT

External notifications related to virtual spaces, such as virtual game spaces may be provided to users. The notifications may provide an indication of events that have occurred in the virtual game spaces, offers of virtual goods, and/or other information related to the virtual game spaces. External notifications may be sent, for example, via email, text message, instant message (external from the virtual space), and/or through other external communication media. This may provide centralized and/or coordinated distribution of notifications for a plurality of different virtual game spaces.

17 Claims, 3 Drawing Sheets

SYSTEM AND METHOD OF FACILITATING EXTERNAL NOTIFICATIONS FOR EVENTS THAT OCCUR IN A PLURALITY OF DIFFERENT VIRTUAL SPACES

FIELD

The disclosure relates to the generation of external notifications for events that occur in a plurality of different virtual spaces.

BACKGROUND

The generation of external notifications for events that take place in virtual spaces is known. Such notifications may keep users in touch with a virtual space even when they are not logged in and/or active in the virtual space. Typically, a provider of external notifications generates the notifications separately and discretely from any other virtual spaces. That is, the notifications may not be coordinated between virtual spaces. This may result in users that participate in multiple virtual spaces (e.g., multiple online games) being inundated with external notifications. Further, the providers of the individual virtual spaces may not be able to leverage information about how the user responds to external notifications from other virtual spaces.

SUMMARY

One aspect of the disclosure relates to a system and method for facilitating the distribution of external notifications for a plurality of separate virtual spaces, such as separate virtual game spaces. Processing of notifications may be centralized, even when the virtual spaces themselves are operated by separate entities. For example, such processing may be centralized by a provider of a platform through which the users access the different virtual spaces. The centralization of processing, such as generation, of the notifications may enhance the user experience of the users on the platform, may decrease the cost and/or complications associated with providing external notifications by the operators of the virtual spaces, and/or may provide other enhancements.

In some implementations, a system configured to provide external notifications of events that take place within the virtual spaces may include a server that communicates with client computing platforms associated with the users. The server may be in communication with a plurality of space servers that are hosting different virtual spaces. The server may be configured to execute computer program modules. The computer program modules may include one or more of an environment module, a user module, a notification parameter module, a notification determination module, a notification generation module, a notification response tracking module, a space operator interface module, and/or other modules.

The environment module may be configured to provide a platform to the users through which the users access the virtual spaces. The platform may include a virtual environment. The virtual environment may include a virtual space, one or more interactive, electronic social media, and/or other virtual environments.

The user module may be configured to manage user platform profiles associated with individual users. The user platform profiles may include a first platform profile associated a first user. The user platform profiles may include information related to virtual game spaces the users participate, sets of notification information that facilitate determinations as to whether notifications related to the virtual game spaces should be sent to the users, and/or other user information. Responsive to the first user participating in a first virtual game space and a second virtual game space, the first platform profile may include information related to the participation of the first user in the first virtual game space and the second virtual game space. The first platform profile may include a first set of notification information. The first set of notification information may facilitate determinations as to whether notifications related to the first virtual game space and the second virtual game space should be transmitted to the first user.

The notification parameter module may be configured to receive notification parameter sets. The individual notification parameter sets may include notification parameters for separate notifications that are to be transmitted to the users. The notification parameter module may be configured to receive notification parameter sets for the first virtual game space and for the second virtual game space from the operator(s) of such virtual spaces.

The notification determination module may be configured to determine whether notifications based on the individual notification parameters sets should be generated. These determinations may be based on the notification parameters in the notification parameter sets, sets of notification information in the user platform profiles, and/or other information. For example, responsive to reception of a first notification parameter set for a notification to the first user related to the first virtual game space, the notification determination module may determine whether a first notification should be generated in accordance with the first notification parameter set based on the first set of notification information. The notification determination module may be configured such that the information in the first set of notification information on which the determination as to whether the first notification should generated is made may include user configured settings. The notification determination module may be configured such that the information in the first set of notification information on which the determination as to whether the first notification should generated is made may include information related to notifications previously generated for the first user. For example, the information related to notifications previously generated for the first user may include information related to a previous notification regarding the second virtual game space.

The notification generation module may be configured to generate notifications defined by the notification parameter sets received by the notification parameter module. A given notification generated based on a given notification parameter set may be generated responsive to a determination by the notification determination module that the notification should be generated in accordance with the given notification parameter set. Generation of the given notification in accordance with the given notification parameter set may include causing the given notification to be transmitted to the user(s) specified in the given notification parameter set.

The notification response tracking module may be configured to track responses to notifications sent to the users. The results of such tracking may be added to to the user platform profiles. For example, the information in the first set of notification information on which the determination as to whether the first notification should generated is made may include results of tracking responses of the first user to one or more previous notifications. Tracking the response of the first user to a notification may include one or more of determining whether the notification was opened, determining whether or not the notification was deleted, determining whether or not the first user performed an action in a corresponding virtual space based on the notification, and/or other determinations.

The space operator interface module may be configured to provide a user interface to operators of the virtual spaces. The user interface may be configured to receive entry and/or selection of information related to notifications. Such information may include information used by the notification determination module in determining whether notifications should be generated. For example, a space operator may indicate that a given user (or set of users) should or should not receive notifications of a specific type, dealing with a specific subject matter, and/or other groups of notifications. Such information may be stored to the user profile of the user as notification information. The user interface may be configured to receive entry and/or selection of art assets (e.g., for storage on the server to be included in notifications), user groupings, and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
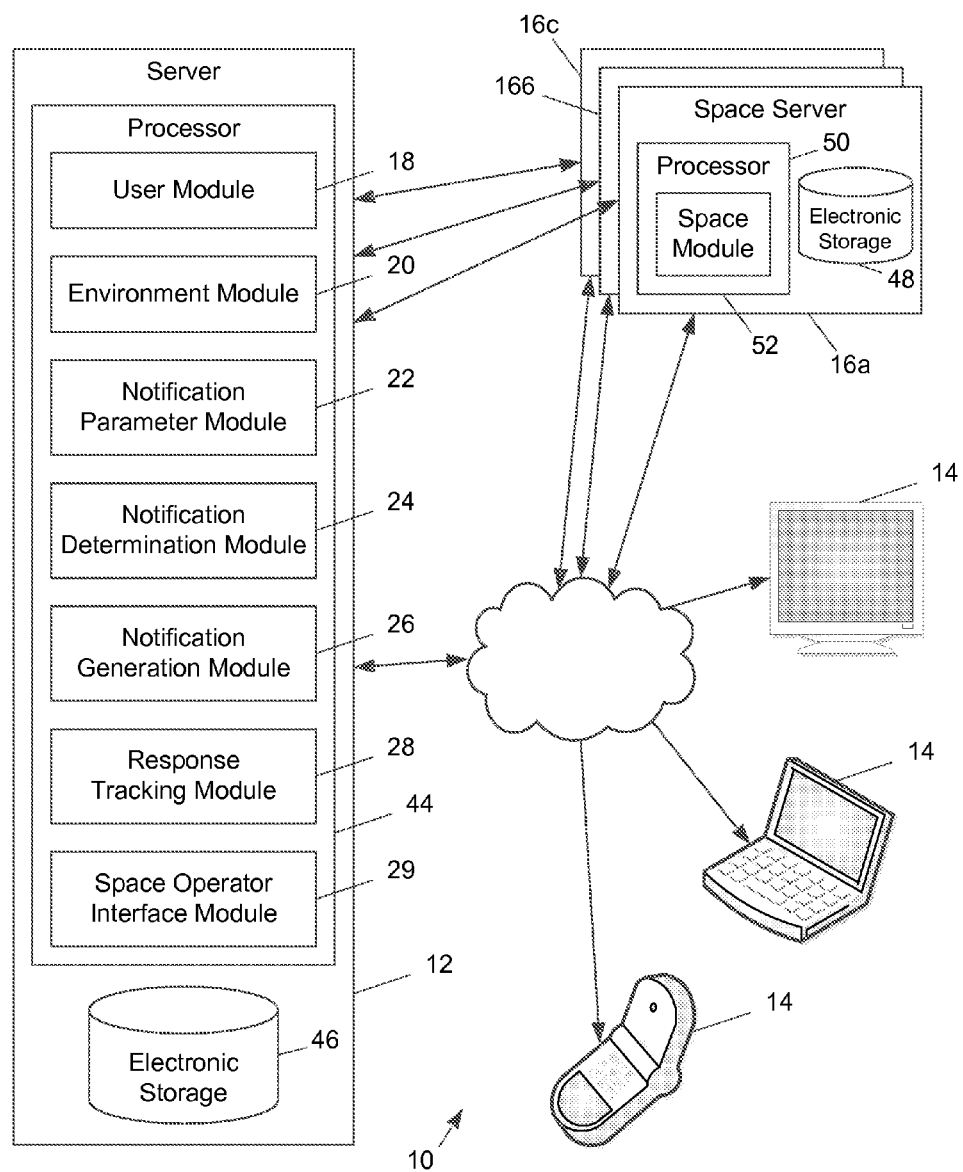
FIG. 1 illustrates a system configured to facilitate external notifications to users for a plurality of different virtual spaces.

FIG. 1 illustrates a system 10 configured to provide external notifications related to virtual spaces, such as virtual game spaces. The notifications may provide an indication of events that have occurred in the virtual game spaces, offers of virtual goods, and/or other information related to the virtual game spaces. External notifications may be sent, for example, via email, text message, instant message (external from the virtual space), and/or through other external communication media. System 10 may provide centralized and/or coordinated distribution of notifications for a plurality of different virtual game spaces. This may make providing external notifications more practicable, may enhance engagement or response of users to external notifications, may facilitate user management of notifications they have received, and/or provide other enhancements. In some implementations, system 10 may include a server 12. The users may access system 10 and/or a virtual environment hosted by server 12 via client computing platforms 14.

The virtual spaces for which notifications are generated may include virtual spaces hosted by space servers 16 (illustrated in FIG. 1 as space servers 16a, 16b, and 16c). The users may access the virtual spaces in a client/server configuration with individual ones of space servers 16. In some implementations, space servers 16 may execute instances of different virtual spaces, and not just different instances of the same virtual space. Server 12 may provide a platform (e.g., a virtual environment and/or other platform) through which the users access the virtual spaces provided by space servers 16. The platform may provide a single virtual access point for the virtual spaces as a whole. For example, by logging into the platform provided by server 12, the users may thereby gain access to all of the virtual spaces in which they have accounts.

Server 12 may be configured to execute one or more computer program modules. The one or more computer program modules may include one or more of a user module 18, an environment module 20, a notification parameter module 22, a notification determination module 24, a notification generation module 26, a response tracking module 28, a space operator interface module 29, and/or other modules.

User module 18 may be configured to access and/or manage one or more user platform profiles associated with users of system 10. The user platform profiles may include user information. The user information may include information stored by server 12, one or more of the client computing platforms 14, one or more of space servers 16 and/or other storage locations. The user platform profiles may include, for example, information identifying users (e.g., a username or handle, a number, an identifier, and/or other identifying information) within the platform and/or one or more of the virtual spaces, security login information (e.g., a login code or password), virtual space account information, subscription information, virtual currency account information (e.g., related to currency held in credit for a user), relationship information (e.g., information related to relationships between users in the platform and/or one or more of the virtual spaces), virtual space usage information, demographic information associated with users, interaction history among users in the platform and/or the virtual spaces, information stated by users, purchase information of users, browsing history of users, a client computing platform identification associated with a user, a phone number associated with a user, user settings, real world contact information (e.g., email address, phone number, mailing address, and/or other information), and/or other information related to users. The user information may include and/or indicate an activity level of the user. The activity level may include previous login time(s), previous logout time(s), login frequency, time spent logged in, and/or other activity information.

As will be discussed further below, users may participate in the virtual spaces by controlling entities within the virtual spaces. The user information in the user platform profiles may include information related to the entities controlled by the users in the virtual space. Such information may include, for example, an entity type, an entity class, an entity identification, a level, inventory information, status information, and/or other information related to entities controlled by users in the virtual spaces. The information included in the user platform profiles may include sets of notification information for the individual users. Notification information for a given user may include one or more of a record of notifications previously provided to the given user, information related to responses of the given user to previous notifications, user configured settings related to notifications, and/or other information.

Environment module 20 may be configured to provide one or more virtual environments to users via client computing platforms 14. As used herein, a "virtual environment" may include a virtual space, one or more interactive, electronic social media, and/or other virtual environments.

Interactive, electronic social media may include one or more of a social network service and/or website, a virtual space, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users. Some non-limiting specific examples of interactive, electronic social media may include the micro-blogging service provided by Twitter™, the social network provided by Facebook™, the social network provided by MySpace™, the social network provided by Foursquare®, the virtual world provided by SecondLife®, the massively multi-player online game provided by World of Warcraft®, the file sharing service provided by Flickr®, Blogger, YouTube, PlayStation® Home, Xbox® Live, and/or other interactive electronic social media.

Notification parameter module 22 may be configured to receive notification parameter sets. The individual notification parameter sets may define notifications for generation. The notification parameter sets may be received by notification parameter module 22 from space servers 16, and/or other sources. The notification parameters in a given notification parameter set may include one or more of an identification of a user to receive the corresponding notification, content to be included in the notification, an offer or incentive to be included in the notification, a format or layout of the notification, a time at which the notification should be generated, an importance level, and/or other information related to the notification. The notification parameter sets may be generated by space servers 16 responsive to trigger events in the virtual spaces, to report virtual space news periodically, to provide offers or incentives to users, and/or for other purposes. The notification parameter sets may be generated in a manner that is similar to or the same as notifications are generated in U.S. patent application Ser. No. 13/527,540, entitled, "SYSTEM AND METHOD FOR PROVIDING EXTERNAL NOTIFICATIONS OF EVENTS IN A VIRTUAL SPACE TO USERS," and filed Jun. 19, 2012, which is hereby incorporated by reference into the present disclosure in its entirety.

Receiving the notification parameter sets from providers of different virtual spaces (e.g., from space servers 16) may facilitate coordinated delivery of notifications across the virtual spaces, even if the virtual spaces are operated by different entities. Further, the reception of notification parameter sets, and generation of notifications based on the same may reduce the amount of programming and/or user information maintenance need by the virtual space providers to implement external notifications. This may enhance the overall quality of the user experience for users that access the virtual spaces through the platform provided by server 12.

Notification determination module 24 may be configured to determine whether notifications related to the virtual spaces should be generated from the notification parameter sets. For a given notification parameter set, this determination may be made based on one or more of the notification parameters in the notification parameter set, notification information in the user platform profile of the user(s) indicated by the notification parameter set as potential recipients, and/or other factors. To make the determinations, notification determination module 24 may implement rules that determine whether a notification should be generated for the given parameter set as a function of the notification parameters, notification information, and/or other factors.

The rules implemented by notification determination module 24 may include a rule that manages an overall number of notifications generated for a given user. This may include ensuring that the number of notifications generated for the given user across the virtual spaces in which the given user participates does not breach some threshold number. The threshold number may be configured by the user as a setting, set by an administrator, may fluctuate based on a level of importance of the notifications generated, may be determined by monitoring the users responsive to past notifications, and/or determined in other ways. This may ensure that the user is not inundated by notifications from her virtual spaces, even though the individual virtual space providers may be unaware (at least at the time that notification parameter sets are generated) of notifications generated for the user by other virtual space providers.

The rules implemented by notification determination module 24 may include a rule that gives a greater importance to notification parameter sets that provide an offer or an incentive (e.g., for a virtual item, or other offers or incentives) to the user. This may ensure that users receive notifications that provide them with some tangible benefit in one or more virtual spaces.

The rules implemented by notification determination module 24 may include a rule that determines whether or not to generate a notification to the user based on the user's responses to past notifications. For example, if the notification parameter set corresponds to a notification similar to or having some commonality with notifications the user was relatively likely (e.g., with respect to notifications in general) to respond to (e.g., to open, to read, to redeem, and/or other responses), the rule may dictate that a notification be generated. This may include searching notification content that has a keyword corresponding to past notifications that were responded to in the past, a title corresponding to titles of past notifications that were responded to, identifying a source virtual space having notifications to which the user responded to in the past, and/or performing other analysis of an incoming notification parameter set for commonality with previous notifications that were responded to favorably by the user.

Notification determination module 24 may be configured such that the determination of whether or not the notification to the user should be generated may be based on the user's activity. For example, the determination may include comparing an amount of time since the user last logged in to the virtual space corresponding to a received notification parameter set with a threshold time period. This may include generating the notification for the notification parameter set responsive to the time since the last log in being less than the threshold (e.g., to target an active user), generating the notification responsive to the time since the last log in being greater than the threshold (e.g., to target users that are less active and/or that may be leaving the virtual space), and/or using the comparison in other ways. Other rules that determine a notification should be generated based on activity (e.g., based on login frequency, and/or other metrics related to activity) may be implemented.

Notification determination module 24 may be configured such that the determination of whether or not the notification to the user should be generated may be based on a use's purchase history. For example, the determination may include comparing an amount of time since the user's last purchase with a threshold, comparing an amount spent during some time period (e.g., fixed, such as this month, or rolling, such as over the past 7 days) with a threshold, comparing an average amount spent on purchase with a threshold, and/or based on other analysis of the users purchase history.

Notification determination module 24 may be configured to merge notifications. For example, responsive to receiving a threshold number of notification parameter sets for which notifications to the user should be generated, notification determination module 24 may be configured to merge the notifications for the received notification parameter sets into a single notification.

Notification generation module 26 may be configured to generate notifications defined by the notification parameter sets received by notification parameter module 22. A given notification generated based on a given notification parameter set may be generated responsive to a determination by notification determination module 24 that the a notification should be generated in accordance with the given notification parameter set. Generation of the given notification in accordance with the given notification parameter set may include causing the given notification to be transmitted to the user(s) specified in the given notification parameter set. The notification may be transmitted via, for example, email, text message (e.g., SMS message, or other text messages), chat, instant messenger, and/or other means for electronic communication. In some implementations, notification generation module 26 may be configured to cause notification to be transmitted by a messaging system provided as part of the virtual environment provided by environment module 20. The mechanism for transmitting the given notification may be specified by the given notification parameter set, by user information associated with the receiving user(s), and/or determined in other ways.

Figure 2:
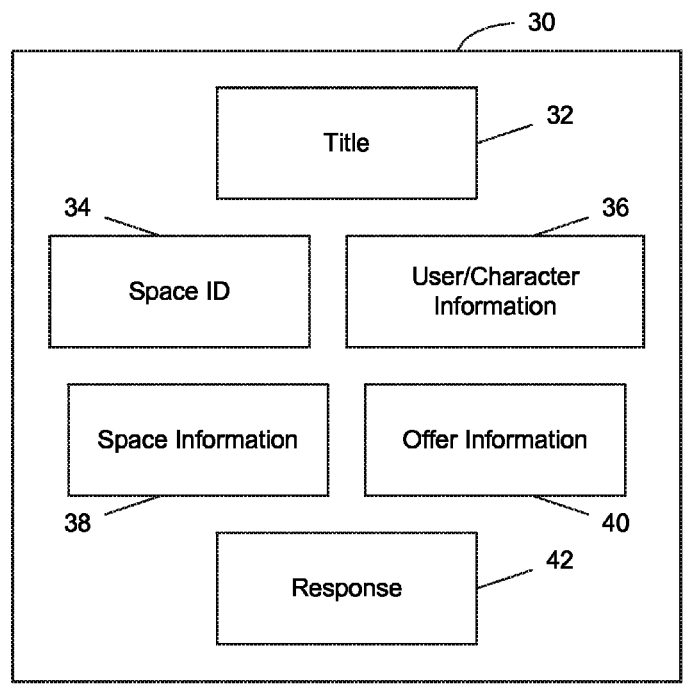
FIG. 2 illustrates a view of an external notification.

FIG. 2 provides an illustration of a view 30 of an external notification. View 30 may be displayed on a client computing platform (e.g., client computing platforms 14 shown in FIG. 1 and described herein). As can be seen in FIG. 2, view 30 may include one or more of a title field 32, a space identification field 34, a user/character information field 36, a space information field 38, an offer field 40, a response field 42, and/or other fields. Title field 32 may be configured to present a title of the external notification to a user. Space identification field 34 may be configured to present an identification of the virtual space the external notification pertains to. User/character information field 36 may present information related to a user and/or character of the virtual space for which the external notification is intended. Space information field 38 may be configured to provide information to the user about the virtual space. The information may indicate events that have happened, are happening, and/or are about to happen in the virtual space, and/or other information about the virtual space that may be of interested to the user. The information about the virtual space may include tips or guidance for the user, and/or other information. Offer field 40 may be configured to present an offer to the user. The offer may include an offer of a rebate, an offer of a virtual item, an offer of access to premium content, and/or other offers. Response field 42 may be configured to receive entry and/or selection of a response of the user to the external notification. The response may include, for example, acceptance of an offer, logging in to the virtual space, forwarding the notification to one or more other individuals, and/or other responses.

Returning to FIG. 1, response tracking module 28 may be configured to track responses of the users to external notifications. Information related to the tracked responses may be included by response tracking module 28 in the user profiles managed by user module 18. Tracking a response of a user to a notification may include determining whether the user has opened the notification, read the notification, deleted the notification, performed an action in a corresponding virtual space (e.g., logging in, performing a quest, purchasing an item, and/or other actions) based on the notification, and/or other activities. Response tracking module 28 may track user responses based on information obtained from client computing platforms 14, based on information received from space servers 16, information received from a communication provider (e.g., an email server through which the notification was transmitted to the user and/or other communication providers), and/or based on other information. The information obtained by response tracking module 28 in tracking user responses may form basis on which notification determination module 24 determines whether notifications should be generated (e.g., as described herein).

Space operator interface module 29 may be configured to provide a user interface for virtual space operators to manage the generation of notifications. For example, the user interface provided by space operator interface module 29 may be configured to receive entry and/or selection of information related to which users should receive notifications and/or which kinds of notifications. Such information, may be stored, for example, as notification information in the user profiles of the user. For example, a space operator may enter or select a communication media for delivering notifications to a user, a notification type that should be sent to a user, a notification type that should not be sent to a user, event types for which notifications should be sent to a user, event types for which notifications should not be sent to a user, groupings of users for notification purposes (e.g., groups that should receive different types of notifications), and/or other information. Upon the storage of such information to the user profiles as notification information, this information may provide a basis on which notification determination module 24 determines whether a given user should receive a notification based on a given notification parameter set.

The user interface provided by space operator interface module 29 may be configured to receive entry and/or selection of other information related to notifications. For example, through the user interface, virtual space operators may provide art assets for use in notifications, and/or other information. The user interface may be configured to receive entry and/or selection of settings, such as threshold levels, used by notification determination module 24 in determining whether notifications should be generated. The user interface may be provided to virtual space operators, for example, through a webpage, a web app, and/or through other configurations.

Server 12 and/or client computing platforms 14 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 12 and/or client computing platforms 14 may be operatively linked via some other communication media.

A given client computing platform 14 may include one or more processors configured to execute computer program modules. The computer program modules may be configured to enable a user associated with the given client computing platform 14 to interface with server 12, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

Server 12 may include electronic storage 44, one or more processors 46, and/or other components. Server 12 may include communication lines, or ports to enable the exchange of information with a network and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented by a cloud of computing platforms operating together as server 12.

Electronic storage 44 may comprise electronic storage media that electronically stores information. The electronic storage media of electronic storage 44 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 44 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 44 may include one or more virtual storage resources (e.g., cloud storage, a virtual private network, and/or other virtual storage resources). Electronic storage 44 may store software algorithms, information determined by processor 46, information received from server 12, information received from client computing platforms 14, and/or other information that enables server 12 to function as described herein.

Processor(s) 46 is configured to provide information processing capabilities in server 12. As such, processor 46 may include one or more of a digital processor, an analog processor, a digital circuit designed to process information, an analog circuit designed to process information, a state machine, and/or other mechanisms for electronically processing information. Although processor 46 is shown in FIG. 1 as a single entity, this is for illustrative purposes only. In some implementations, processor 46 may include a plurality of processing units. These processing units may be physically located within the same device, or processor 46 may represent processing functionality of a plurality of devices operating in coordination. The processor 46 may be configured to execute modules 18, 22, 24, 26, and/or 28. Processor 46 may be configured to execute modules 18, 22, 24, 26, and/or 28 by software; hardware; firmware; some combination of software, hardware, and/or firmware; and/or other mechanisms for configuring processing capabilities on processor 46.

It should be appreciated that although modules 18, 22, 24, 26, and 28 are illustrated in FIG. 1 as being co-located within a single processing unit, in implementations in which processor 46 includes multiple processing units, one or more of modules 18, 22, 24, 26, and/or 28 may be located remotely from the other modules. The description of the functionality provided by the different modules 18, 22, 24, 26, and/or 28 described below is for illustrative purposes, and is not intended to be limiting, as any of modules 18, 22, 24, 26, and/or 28 may provide more or less functionality than is described. For example, one or more of modules 18, 22, 24, 26, and/or 28 may be eliminated, and some or all of its functionality may be provided by other ones of modules 18, 22, 24, 26, and/or 28. As another example, processor 46 may be configured to execute one or more additional modules that may perform some or all of the functionality attributed below to one of modules 18, 22, 24, 26, and/or 28.

A given one of space servers 16a may be configured to provide a virtual space to the users of system 10. Space server 16a may include one or more of one or more processors 48, electronic storage 50, and/or other components. Processor 48 may be the same as or similar to processor 46. Electronic storage 50 may be the same as or similar to electronic storage 44. Space server 16a may be configured to execute a space module 52.

Space module 52 may be configured to implement the instance of the virtual space executed by the computer modules to determine view information defining views of the virtual space. The view information may then be communicated (e.g., via streaming, via object/position data, and/or other information) from server 12 to client computing platforms 14 for presentation to users. The view information determined and transmitted to a given client computing platform 14 may correspond to an entity being controlled by a user via the given client computing platform 14. The view information determined and transmitted to a given client computing platform 14 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user. The view information may include state information (e.g., describing a state of the virtual space and/or a game therein) from which client computing platform 14 can determine one or more views of the space.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 52 is not intended to be limiting. Space module 52 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 16, users may control entities to interact with the virtual space and/or each other. The entities may include one or more of characters, objects, simulated physical phenomena (e.g., wind, rain, earthquakes, and/or other phenomena), and/or other elements within the virtual space. The user characters may include avatars. As used herein, an entity may refer to an object (or group of objects) present in the virtual space that represents an individual user. The entity may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

Control over the entities may be exercised by the users through control inputs and/or commands input through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server 12 (e.g., through space module 52).

Within the virtual space, users may participate in a game. The game may include various tasks, levels, quests, and/or other challenges or activities for users to participate in. The game may include activities in which users (or their entities) are adversaries, and/or activities in which users (or their entities) are allies. The game may include activities in which users (or their entities) are adversaries of non-player characters, and/or activities in which users (or their entities) are allies of non-player characters. In the game, entities controlled by the user may obtain points, virtual currency or other virtual items, experience points, levels, and/or other demarcations indicating experience and/or success. Space module 52 may be configured to perform the functions associated with the game in executing the instance of the virtual space.

Figure 3:
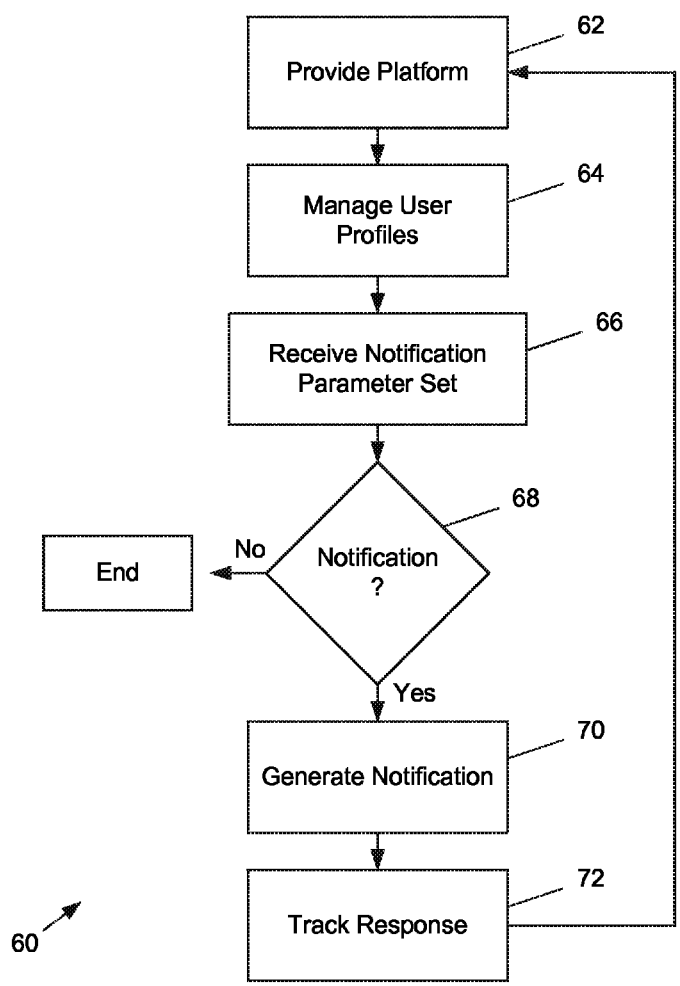
FIG. 3 illustrates a method of facilitating external notifications to users for a plurality of different virtual spaces.

FIG. 3 illustrates a method 60 of facilitating external notifications of events that take place within virtual spaces. The operations of method 60 presented below are intended to be illustrative. In some embodiments, method 60 may be accomplished with one or more additional operations not described, and/or without one or more of the operations discussed. Additionally, the order in which the operations of method 60 are illustrated in FIG. 3 and described below is not intended to be limiting.

In some embodiments, method 60 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 60 in response to instructions stored electronically on an electronic storage medium. The one or more processing devices may include one or more devices configured through hardware, firmware, and/or software to be specifically designed for execution of one or more of the operations of method 60.

At an operation 62, a platform may be provided to users. The platform may facilitate access to a plurality of virtual spaces for the users. The platform may include a virtual environment through which the users access the plurality of virtual spaces. The users may include a first user. The first user may access a first virtual space and a second virtual space through the platform. In some implementations, operation 62 may be performed by an environment module the same as or similar to environment module 20 (shown in FIG. 1 and described herein).

At an operation 64, user platform profiles for users may be managed. The user platform profiles may include a first platform profile associated with a first user. The first platform profile may include information related to the participation of the first user in the first virtual space and the second virtual space, a first set of notification information that facilitates determinations as to whether notifications related to the virtual spaces should be sent to the first user. In some implementations, operation 64 may be performed by a user module the same as or similar to user module 18 (shown in FIG. 1 and described herein).

At an operation 66, a first notification parameter set may be received. The first notification parameter set may be for a first notification to the first user related to the first virtual space. In some implementations, operation 66 may be performed by a notification parameter module the same as or similar to notification parameter module 22 (shown in FIG. 1 and described herein).

At an operation 68, a determination may be made as to whether the first notification should be generated for the first user. The determination may be based on the notification parameters in the first notification parameter set, the first set of notification information, and/or other information. In some implementations, operation 68 may be performed by a notification determination module the same as or similar to notification determination module 24 (shown in FIG. 1 and described herein). Responsive to a determination that the first notification should not be generated, method 60 may not result in generation of a notification to the first user. Responsive to determination that the first notification should be generated, method 62 may proceed to an operation 70.

At operation 70, the first notification may be generated. In some implementations, operation 70 may be performed by a notification generation module the same as or similar to notification generation module 26 (shown in FIG. 1 and described herein).

At an operation 72, a response of the first user to the first notification may be tracked. In some implementations, operation 72 may be performed by a response tracking module the same as or similar to response tracking module 28 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to provide external notifications of events that take place within virtual spaces, the system comprising:

one or more processors configured to execute computer program modules, the computer program modules comprising:

a user module configured to manage user platform profiles associated with individual users, the user platform profiles include a first platform profile associated a first user, wherein the user platform profiles comprise:

information related to virtual game spaces the users participate in such that, responsive to the first user participating in a first virtual game space and a second virtual game space, the first platform profile includes information related to the participation of the first user in the first virtual game space and the second virtual game space; and sets of notification information that facilitate determinations as to whether notifications related to the virtual game spaces should be sent to the users such that the first platform profile includes a first set of notification information that facilitates determinations as to whether notifications related to the first virtual game space and the second virtual game space should be transmitted to the first user;

a notification parameter module configured to receive notification parameter sets, wherein the individual notification parameter sets include notification parameters for separate notifications that are to be transmitted to the users, wherein the notification parameter module is configured to receive notification parameter sets for the first virtual game space and for the second virtual game space;

a notification determination module configured to determine whether notifications based on the individual notification parameters sets should be generated based on sets of notification information in the user platform profiles such that, responsive to reception of a first notification parameter set for a notification to the first user related to the first virtual game space, the notification determination module determines whether a first notification should be generated in accordance with the first notification parameter set based on the first set of notification information; and a notification response tracking module configured to track responses to notifications sent to the users, and to add the results of such tracking to the user platform profiles, and wherein the notification determination module is further configured such that the information in the first set of notification information on which the determination as to whether the first notification should generated is made includes results of tracking responses of the first user to one or more previous notifications.

2. The system of claim 1, wherein the notification determination module is configured such that the information in the first set of notification information on which the determination as to whether the first notification should generated is made includes user configured settings.

3. The system of claim 1, wherein the notification determination module is configured such that the information in the first set of notification information on which the determination as to whether the first notification should generated is made includes information related to notifications previously generated for the first user.

4. The system of claim 3, wherein the information related to notifications previously generated for the first user includes information related to a previous notification regarding the second virtual game space.

5. The system of claim 4, wherein the notification determination module is configured to manage an overall number of notifications generated for the first user.

6. The system of claim 1, wherein the notification tracking module is configured such that tracking the response of the first user to a notification includes determining one or more of determining whether the notification was opened, determining whether or not the notification was deleted, or determining whether or not the first user performed an action in a corresponding virtual space based on the notification.

7. The system of claim 1, wherein the user platform profiles correspond to a virtual environment from which the users access the virtual game spaces.

8. The system of claim 7, wherein the virtual environment is a social networking website.

9. The system of claim 1, wherein the computer program modules further comprise a notification generation module configured to generate notifications by causing the notifications to be transmitted to the users.

10. A computer-implemented method of providing external notifications of events that take place within virtual spaces, the method being implemented in a computer system that includes one or more physical processors, the system comprising:

managing user platform profiles associated with individual users, the user platform profiles include a first platform profile associated a first user, wherein the user platform profiles comprise:

information related to virtual game spaces the users participate in such that, responsive to the first user participating in a first virtual game space and a second virtual game space, the first platform profile includes information related to the participation of the first user in the first virtual game space and the second virtual game space; and sets of notification information that facilitate determinations as to whether notifications related to the virtual game spaces should be sent to the users such that the first platform profile includes a first set of notification information that facilitates determinations as to whether notifications related to the first virtual game space and the second virtual game space should be transmitted to the first user, the first set of notification information including results of tracking responses of the first user to one or more previous notifications;

receiving a first notification parameter set that includes notification parameters for a first notification to the first user related to the first virtual game space;

determining whether the first notification should be generated in accordance with the first notification parameter set based on the first set of notification information including the results of tracking responses of the first user to one or more previous notifications.

11. The method of claim 10, wherein the information in the first set of notification information on which the determination as to whether the first notification should generated is made includes user configured settings.

12. The method of claim 10, wherein the information in the first set of notification information on which the determination as to whether the first notification should generated is made includes information related to notifications previously generated for the first user.

13. The method of claim 12, wherein the information related to notifications previously generated for the first user includes information related to a previous notification regarding the second virtual game space.

14. The method of claim 13, wherein the determination as to whether the first notification should be generated is made in the course of managing an overall number of notifications generated for the first user.

15. The method of claim 10, wherein the first user platform profile corresponds to a virtual environment from which the first user accesses the virtual game spaces.

16. The method of claim 15, wherein the virtual environment is a social networking website.

17. The method of claim 10, further comprises, responsive to a determination that the first notification should be generated, generating the first notification by causing the first notification to be transmitted to the first user.

* * * * *